United States Patent [19]
Furuta et al.

[11] 3,979,191
[45] Sept. 7, 1976

[54] METHOD FOR DENITRATING EXHAUST GASES

[75] Inventors: Isao Furuta, Mikata; Kazuhito Yagaki; Masami Takao, both of Kobe, all of Japan

[73] Assignee: Kobe Steel Ltd., Kobe, Japan

[22] Filed: Jan. 27, 1975

[21] Appl. No.: 544,380

[52] U.S. Cl. ............................. 55/68; 55/84; 423/235
[51] Int. Cl.² ........................................ B01D 53/34
[58] Field of Search ............ 55/66, 68, 84; 423/212, 423/235, 239

[56] References Cited
UNITED STATES PATENTS

| | | | |
|---|---|---|---|
| 3,121,624 | 2/1964 | Matsch et al. ........................ | 55/68 X |
| 3,149,907 | 9/1964 | Karwat ................................ | 423/235 |
| 3,552,912 | 1/1971 | Bartholomew et al. .......... | 423/235 X |
| 3,864,450 | 2/1975 | Takeyama et al. .............. | 423/212 X |

FOREIGN PATENTS OR APPLICATIONS

| | | | |
|---|---|---|---|
| 708,890 | 5/1965 | Canada .............................. | 423/235 |

*Primary Examiner*—Charles N. Hart
*Assistant Examiner*—Robert H. Spitzer
*Attorney, Agent, or Firm*—Oblon, Fisher, Spivak, McClelland & Maier

[57] ABSTRACT

Exhaust gases are denitrated by a method comprising removing NO from exhaust gases which comprises washing the exhaust gas with a first aqueous solution containing a chloride of Mg or Ca, and a hypochlorite of Mg or Ca, and washing said washed gas with a second aqueous solution of an alkali.

6 Claims, 3 Drawing Figures

METHOD FOR DENITRATING EXHAUST GASES

BACKGROUND OF THE INVENTION

1. Field of the Invention

This invention relates to a highly efficient and economical method for denitration of exhaust gases.

2. Description of Prior Art

It is known to remove NO from exhaust gases by oxidation to $NO_2$ employing NaClO, $Ca(ClO)_2$, $H_2O_2$, $KMnO_4$, $(NH_4)_2S_2O_5$ or the like as a denitrating agent. This method, however, is insufficient from several points of view. For one, these denitrating agents are expensive; they wear away rapidly; they have a very high decomposition rate and, hence, great danger is involved in the denitration step; heavy metals contained in the denitrating agents end up in waste water, thereby causing pollution problems; and even in the case wherein an alkali metal is formed as a by-product and recovered, the cost is high and no industrial advantages accrue. Therefore, none of these known methods have been practiced industrially for nitration of boiler exhaust gases, combustion furnace exhaust gases or the like and no denitration method sufficiently applicable to industrial scale operation has heretofore been established. Nevertheless, it would be highly desirable to have such a process.

SUMMARY OF THE INVENTION

Accordingly, it is one object of the present invention to provide a process for denitration of exhaust gases which does not require the use of expensive, or inherently dangerous denitrating agents.

A further object of this invention is to provide a process for removing NO without aggravating the pollution problems with respect to some other type of potential pollutant.

It is another object to provide a process which is suitable for use on an industrial scale.

These and other objects of this invention, as will hereinafter be made clear by the discussion below, have been attained by providing a method for the highly efficient denitration of exhaust gases in which a denitrating agent of the $ClO^-$ type, free of a heavy metal, is employed.

In accordance with the method of this invention, an exhaust gas is washed sequentially with a first aqueous solution containing a chloride and a hypochlorite, and a second alkali containing aqueous solution.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein:

BRIEF DESCRIPTION OF THE DRAWINGS

Figure 1:
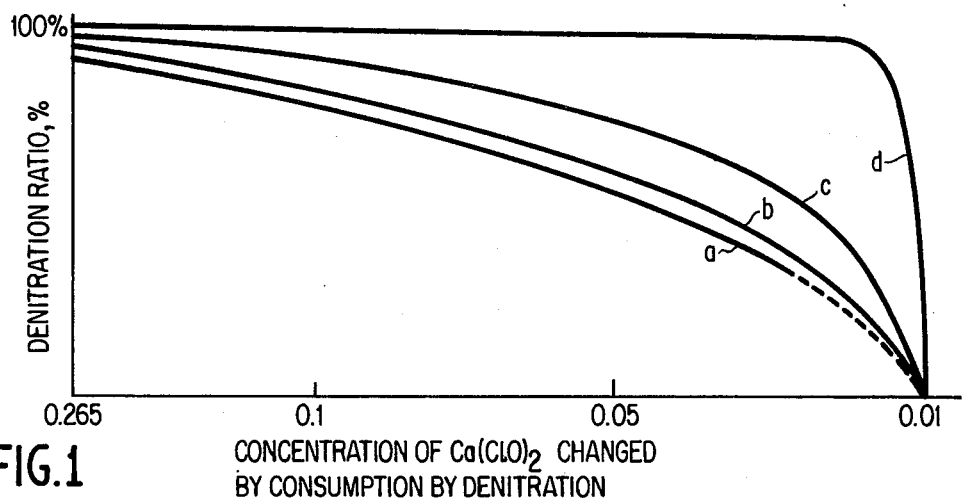

FIG. 1 is a characteristic graph depicting the variation of denitration ratio with changing concentration of $Ca(ClO)_2$ in the denitration solution for several initial concentrations of $CaCl_2$.

Figure 2:
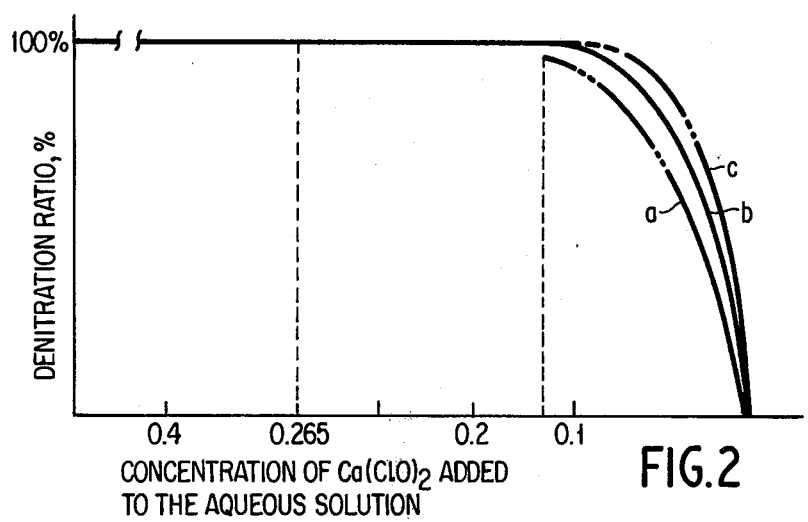

FIG. 2 is a characteristic graph showing the variation of denitration ratio with the changing concentration of $Ca(ClO)_2$ in the denitration solution for several initial concentrations of $Ca(ClO)_2$.

Figure 3:
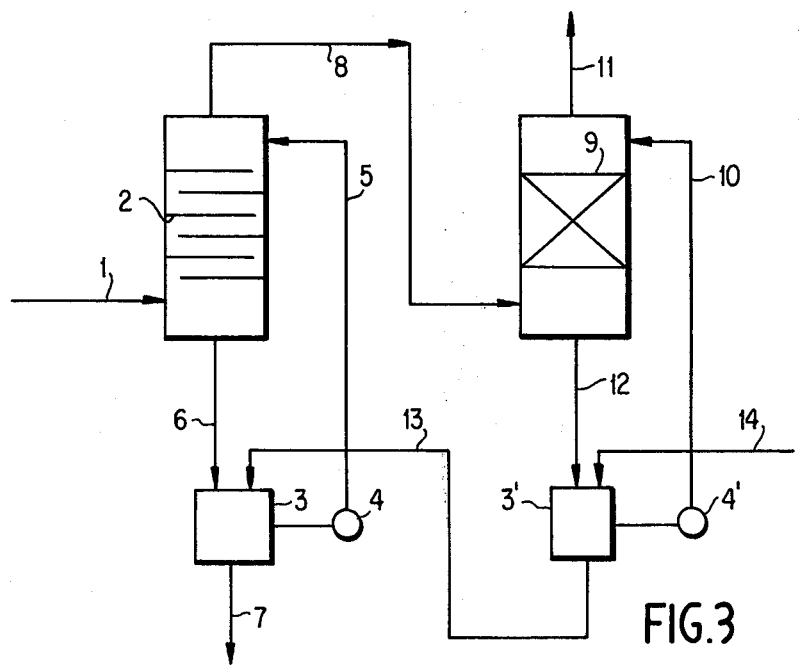

FIG. 3 is a schematic diagram of one embodiment of a complete flow system for practice of this invention.

DESCRIPTION OF THE PREFERRED EMBODIMENTS

According to this invention, the exhaust gas is subjected to a sequential wash treatment in which the first step is a wash with $CaCl_2 + CaClO$. This first step may be carried out in a circulating system whereby the wash liquor is continuously pressed into contact with the exhaust gas. The circulation is continued until the level of nitrogen oxides in the wash liquor reaches a predetermined concentration and then is discharged.

After the exhaust gas is washed with the first wash solution, it is washed in a second alkali containing aqueous solution. The purpose of this second treatment is to permit absorption of any $ClO^-$ or $Cl_2$ into the alkali solution, which may have been carried with the exhaust gas from the first wash step.

The exhaust gas emanating from the second wash contact is then discharged to the atmosphere, or may be conventionally treated to remove other undesirable components of the gas.

The second wash solution may also be used in a continuously recirculating system, being discharged only when the $ClO^-$ or $Cl^-$ level reaches certain predetermined limits: Once the determined levels of $ClO^-$ and $Cl^-$ have been attained, the second wash solution can be recycled and admixed with the first wash solution to replenish the first wash solution.

The concentration of the hypochlorite in the second solution should be 0.01 – 5% wt hypochlorite before it is recycled to the first solution. Best results are attained with the concentration of the hypochlorite is 0.1 – 2% wt. The pH of the second solution should be adjusted to 8 before it is recycled.

The hypochlorite and chloride containing first aqueous solution can be prepared from the corresponding calcium or magnesium salts. The use of the hypochlorite-chloride combination provides particularly superior denitrating effects, particularly as compared to the use of the hypochlorite alone. This superiority should be readily evident from the results reported in FIGS. 1 and 2.

Curve (a) of FIG. 1 shows washing an exhaust gas with $CaCl_2$ used alone as compared with using $CaCl_2 + Ca(ClO)_2$. With $Ca(ClO)_2$ alone, the denitration ratio (NO renewal ratio) is initially 85%, but with consumption of $Ca(ClO)_2$, the ratio decreases. When $CaCl_2$ is added to the $Ca(ClO)_2$, curves $b - d$ (5 – 30% $CaCl_2$), the denitration ratio rose significantly, reaching near 100% initially and then falling off, as the reaction involving the $Ca(ClO)_2$ proceeds. At 30% $CaCl_2$, the denitration ratio remained approximately constant until a considerable amount of $Ca(ClO)_2$ was converted and thereafter denitration begins to drop off rapidly.

The concentration of the salts in the wash solution and the temperature of contact between the wash solution and the exhaust gases will, of course, vary greatly depending upon the amount of nitrogen oxides contained in the exhaust gases, and the flow rate of those gases. In general, suitable results are attained at contact temperatures of from 20° to 120°C. If the contact temperature is too high, the rate of decomposition of the hypochlorite will become too high, resulting in possible excess consumption of hypochlorite. Best results are obtained at a contact temperature of 25° – 80°C.

The concentration of $Cl^-$ and $ClO^-$ should be as follows: The concentration of $CaCl_2$ or $MgCl_2$ should be 5 to 42%, preferably 15 to 35% wt. At concentrations of less than 5%, the proper effect cannot be attained, and at concentrations of greater than 42%, it is wasteful of the salt without obtaining any substantial further improvements.

The concentration of $Ca(ClO)_2$ or $Mg(ClO)_2$ in the denitrating solution should be lower than 20%. If the concentration is elevated above this level, no substantial improvement in the process can be expected. From a viewpoint of economics, it is preferred that the hypochlorite concentration be maintained at 0.1 to 3% wt.

The denitration reaction involving the denitrating agent of this invention can be performed not only in the gas-liquid phase but also, it has been confirmed that a gas phase reaction proceeds when the ratio of generated $O_2$ and $Cl_2$, namely the $O_2/Cl_2$ ratio, and the reaction region are suitably chosen. Good results can be obtained in this invention when a denitration column is employed wherein contact between the exhaust gas and the denitrating solution and wherein the mixing of generated gases with the denitrating solution can be performed repeatedly by use of a perforated plate or a multi-staged tray.

Having generally described the invention, a more complete understanding can be obtained by reference to certain specific examples, which are included for purposes of illustration only and are not intended to be limiting unless otherwise specified.

EXAMPLE 1

$CaCl_2$ was added to $Ca(OCl)_2$ in amounts of 5, 15 and 30% by weight, to a solution containing 0.265 mole (3% wt) of $Ca(OCl)_2$, in 2 liters of water. The solution was maintained at a temperature of 40°C.

A gas having a composition of 8 – 10% $CO_2$ and 500 ppm NO with the balance air was introduced into the solution at a rate of 20 ml/mm. The concentration of $Ca(OCl)_2$ was monitored continuously, and the ratio between the quantity of NO converted to $NO_2$ and the rate of consumption of $Ca(OCl)_2$ was plotted in FIG. 1.

EXAMPLE 2

A 15% wt aqueous solution of $CaCl_2$ was prepared (pH 5.5 to 6.5). To aliquots of the solution, was added $Ca(OCl)_2$, in amounts of 1, 3 and 10% wt. A glass column of 350 mm in height equipped with a bubbler was charged with the solution. A gas having the same composition as in Example 1 was passed at a rate of 1.5 l/min through the solution which was circulated at a rate of 4.5 l/hr.

FIG. 2 shows the relationship of quantity of $Ca(OCl)_2$ added to ratio of denitration. This curve was obtained by adding 1, 3 and 10% $Ca(OCl)_2$ to 15% wt $CaCl_2$ solution. As can be seen, the rate of denitration remained at 100% until the $ClO^-$ level fell to about 0.1 mole and then rapidly fell off.

FIG. 3 is a schematic diagram illustrating one embodiment of a flow system for practice of this invention. An exhaust gas containing NO is introduced into a denitration column 2 through an exhaust gas introduction passage 1. It is washed and denitrated with a liquid aqueous solution of calcium chloride + calcium hypochlorite or aqueous solution of magnesium chloride + magnesium hypochlorite which is fed to the denitration column 2 from a recycle tank 3 via a pump 4 through the passage 5. The denitrating liquid is then returned to the recycle tank 3 through the passage 6 and is continuously reused. When the concentration of nitrogen oxides including the presence of nitrogen oxide by-products reaches a certain prescribed level, the denitrating liquid is discharged through passage 7. In other words, the denitrating liquid is used only while it retains a sufficient denitrating activity. The exhaust gas denitrated in the denitration column 2 is introduced into an alkali washing column 9 through a passage 8. There, it is washed with an alkali solution fed to the alkali washing column 9 from the recycle tank 3' via a pump 4' through a passage 10, whereby $Cl_2$ and $ClO^-$ carried away by the exhaust gas from the denitration column 2 are removed from the exhaust gas. The alkali solution which has thus absorbed $Cl_2$ and $ClO^-$ is returned to the recycle tank 3' from the alkali washing column 9 through the passage 12 and used repeatedly in the same manner. When the concentration of absorbed $Cl_2$ and $ClO^-$ (including the presence of by-products of $Cl_2$ and $ClO^-$) reaches a certain prescribed level, i.e., when the concentration of calcium hypochlorite reaches 0.01 – 5%, preferably 0.1 – 2% for effective denitration, the pH of the alkali solution is adjusted below 8, and it is fed to the recycle tank 3 from the recycle tank 3' through the passage 13 and is thus returned to the denitration step. Further, replenishment of the denitrating liquid is provided by feeding fresh liquid to the recycle tank 3 from the recycle tank 3' through the passage 14. It is also possible to feed such fresh denitrating liquid directly to the recycle tank 3. Similarly, fresh alkali liquid is furnished to the recycle tank 3' through the passage 14. Final discharge of the denitrated exhaust gas is made through passage 11.

From the foregoing experimental results, it can be seen that $CaCl_2$ controls the rate of decomposition of $Ca(ClO)_2$. As a result, the oxidation of NO can be accomplished with little waste, i.e., a high denitration ratio can be maintained for a long period by control of the decomposition of $Ca(ClO)_2$. Furthermore, a solution containing a mixture of $Ca(ClO)_2$ and $CaCl_2$ has the property of readily absorbing NO gas. Additionally, the NO gas absorbed in the solution is hardly released therefrom, regardless of the vapor pressure. The foregoing characteristics are manifested also by a solution containing a mixture of $Mg(ClO)_2$ and $MgCl_2$.

As is apparent from the foregoing illustrations of this invention, by using an aqueous solution of a mixture of calcium chloride and calcium hypochlorite or an aqueous solution of a mixture of magnesium chloride and magnesium hypochlorite, a high denitration efficiency can be attained; this high denitration efficiency can be maintained for a long time; and further, by combining these characteristic features with specific techniques for recycling recovery and reuse of the denitrating solution, great economical advantages can be attained. Additionally, a key feature of the invention is that no harmful heavy metals are discharged into waste water or the like. Thus, the method of this invention represents a large improvement in the present state-of-the-art of denitration and very effectively solves the problem of environmental pollution by heavy metal wastes.

Having now fully described the invention, it will be apparent to one of ordinary skill in the art that many changes and modifications can be made thereto without departing from the spirit or scope of the invention as set forth herein.

What is claimed as new and intended to be secured by Letters Patent is:

1. A method for removing NO from an exhaust gas which comprises washing the exhaust gas with a first aqueous solution containing 5–42% wt. of a chloride of Mg or Ca, and 0.01–20% wt. of a hypochlorite of Mg or Ca, and washing said washed gas with a second aqueous solution of an alkali.

2. The method of claim 1, wherein the first aqueous solution contains 15 – 30% wt. of calcium chloride and 0.1 – 3% wt. of calcium hypochlorite.

3. The method of claim 1, wherein the exhaust gas is contacted with a first aqueous solution to remove NO from the exhaust gas by absorption of the NO into the first aqueous solution, and wherein the exhaust gas is then contacted with a second circulation system to remove $ClO^-$ and $Cl_2$ from the washed gas by absorption of the $ClO^-$ and $Cl_2$ in the second aqueous solution, and wherein the spent second aqueous solution is recycled into the first aqueous solution to replenish the $ClO^-$ and $Cl_2$ content of said first aqueous solution.

4. The method of claim 3, wherein the spent aqueous solution is one in which the concentration of hypochlorite is 0.01 – 5% wt. when it is recycled to said first solution.

5. The method of claim 3, wherein the spent aqueous solution has a concentration of hypochlorite of 0.1 – 2% wt. when it is recycled to said first solution.

6. The method of claim 3, wherein the spent aqueous solution is supplied to the first circulation system after the pH is adjusted to below 8.

* * * * *